United States Patent [19]

Major et al.

[11] Patent Number: 4,591,750
[45] Date of Patent: May 27, 1986

[54] COMPACT RING SHAPED BRUSH MOTOR

[75] Inventors: Jeffrey T. Major, Cygnet; Robert D. Hall, Berkey, both of Ohio

[73] Assignee: Allied Corporation, Morris Township, N.J.

[21] Appl. No.: 684,534

[22] Filed: Dec. 21, 1984

[51] Int. Cl.$^4$ .......... H02K 9/00; H01R 19/00
[52] U.S. Cl. .................. 310/237; 310/62; 310/268
[58] Field of Search .......... 310/46, 154, 156, 237, 310/268, 267, 164, 62, 63

[56] References Cited

U.S. PATENT DOCUMENTS

| | | | |
|---|---|---|---|
| 2,553,292 | 5/1951 | Barrett | 310/237 |
| 3,354,333 | 11/1967 | Henry-Baudot | 310/267 |
| 4,103,196 | 7/1978 | Saito et al. | 310/237 |
| 4,114,057 | 9/1978 | Esters | 310/46 |
| 4,341,973 | 7/1982 | Maruko et al. | 310/237 |
| 4,360,751 | 11/1982 | Arnold, Jr. et al. | 310/268 |

FOREIGN PATENT DOCUMENTS 25969  7/1953  Finland .................. 310/268

Primary Examiner—Patrick R. Salce
Assistant Examiner—D. L. Rebsch
Attorney, Agent, or Firm—Russel C. Wells; Markell Seitzman

[57] ABSTRACT

A dynamoelectric machine having a rotor formed from a continuous strip of ferrous material and a continuous helically formed conductor thereon. The rotor having a rectangular cross section is mounted on the periphery of a web member. The web member is axially mounted for rotation about a frame and supports a fan. The stator of the machine is axially aligned with the outer circumferential surface of the rotor and provides support for pairs of permanent magnets and an equal number of pairs of brushes. The field magnets are positioned to magnetically link with the winding on the rotor. The brushes are equally and angularly spaced in the frame and operative contact with a commutator integrally formed with the rotor winding.

9 Claims, 8 Drawing Figures

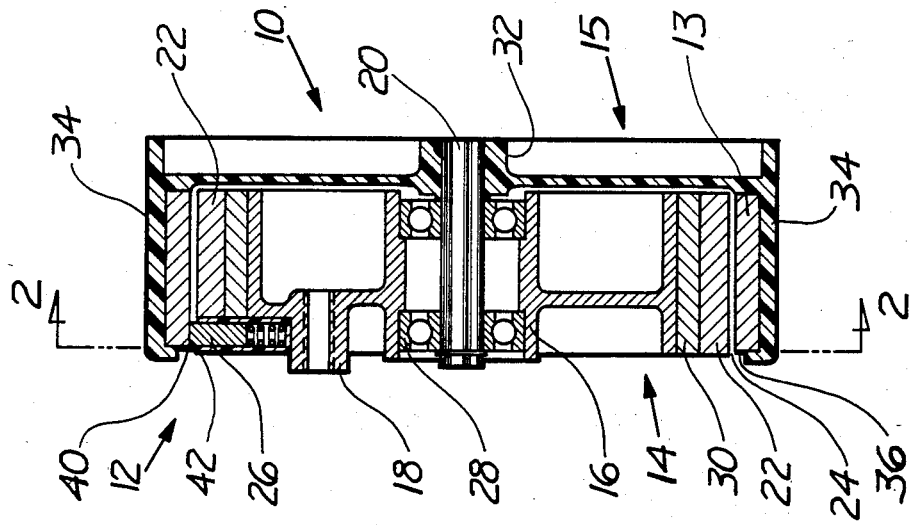
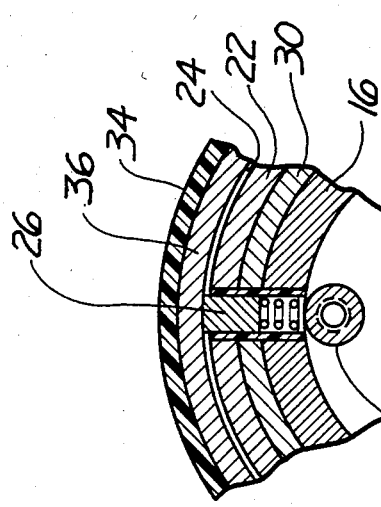
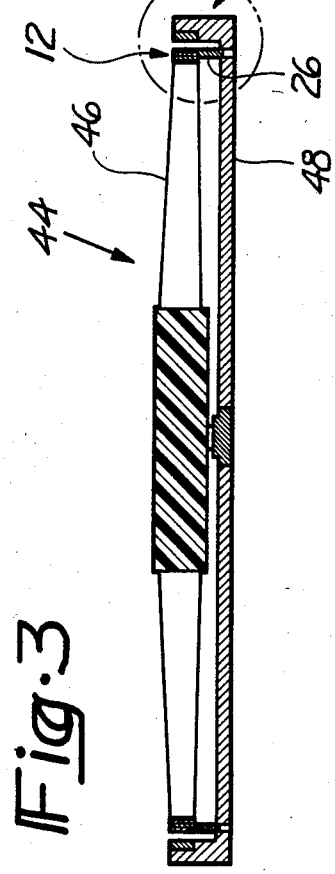

COMPACT RING SHAPED BRUSH MOTOR

This invention relates to a dynamoelectric machine in general and to ring-shaped or hoop motors having a nonscrap armature or rotor.

BACKGROUND OF THE INVENTION

In automotive applications, engine cooling is generally accomplished by means of a fan powered either by an electric motor or belt driven from the main drive shaft of the engine and operative to move air across coils of a radiator. Conventional electric motor applications require that the motor have a shaft extending from the motor on which a fan is mounted. The motor is supported in the shroud surrounding the fan. The axial length of the motor and the fan equals the length of the motor plus the length of the fan hub. As the design of automobiles changes, the amount of space in the engine compartment generally decreases and the requirement for more compact fan assemblies as respects axial length is placed upon the cooling engineer. Fan hub length has been reduced and fan designs have approached their limit in reducing axial length.

SUMMARY OF THE INVENTION

To accomplish the goal defined above it was necessary to reduce the length of the motor, therefore, the dynamoelectric machine as described herein was invented. The dynamoelectric machine has a frame with the stator mounted on the frame. The preferred embodiment has a permanent magnet field although a wound field may be used. The stator supports a plurality of permanent magnets. A rotor member is mounted for rotation in said frame and is axially aligned with the stator. The rotor is fabricated from a continuous strip of ferrous material wound as a toroid and having a rectangular cross-section. The winding on the rotor is helically wound in a single layer and the beginning and ending leads are connected together. In order to maintain compactness, one side of the rectangular cross-section of the rotor winding is stripped of insulation and the result is a commutator wherein the wire itself forms the commutator bars. Finally, at least one pair of brushes are mounted on the frame and aligned to make contact with the commutator.

It is a principle advantage of the dynamoelectric machine described herein to shorten the axial length of the machine.

It is yet another principle advantage of the dynamoelectric machine to fabricate a hoop armature or rotor from a continuous strip material, thereby producing a scrap-less rotor.

Other advantages of the dynamoelectric machine described herein are reducing the manufacturing costs by the omission of separate commutator, having only one connection to make on the armature winding, reducing the amount of copper in the overall motor assembly, utilizing inexpensive magnets in a permanent magnet field, eliminating scrap material in the fabricating of the core of the armature, and above all reducing the time necessary to assemble a motor.

These and other advantages will become apparent from the following detailed description and the accompanying drawings.

DETAILED DESCRIPTION OF THE DRAWINGS

In the drawings;

FIG. 1 is a sectional view of a motor wherein the rotor surrounds the stator.

FIG. 2 is a partial sectional view taken along line 2—2 of FIG. 1.

FIG. 3 is a sectional view taken along an axis of a fan and motor wherein the stator is outboard of the fan.

DETAILED DESCRIPTION

Figure 4:
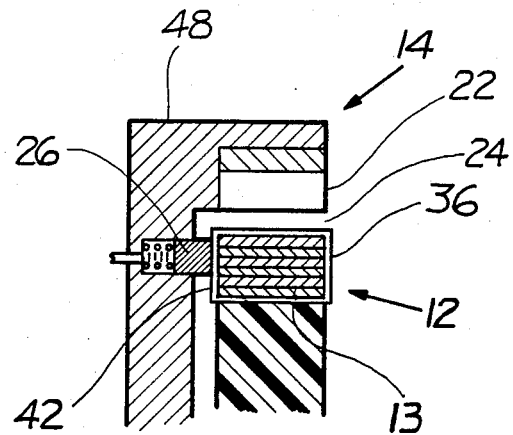
FIG. 4 is an expanded sectional view of the circle of FIG. 3.

Referring to the figures by the characters of reference, there is illustrated in FIG. 1 a sectional view of a substantially cylindrical dynamoelectrical machine or motor 10 constructed according to the principles of the present invention. The motor 10 is constructed with the armature or rotor 12 on the outside rotating around the stator 14. In particular, the motor 10 may have a fan attached, not shown, to a web 15, and used to move air in a motor vehicle cooling system. The armature 12, mounted on the web 15, comprises a core 13 having a winding 36. The stator 14 comprises a frame member 16, a steel back up ring 30 and a plurality of permanent magnets 22.

The frame member 16 has a plurality of mounting lugs 18 and shaft 20 rotatably mounted thereon. The armature 12 is affixed to the inside surface of the web 15 and spaced from the stator by an air gap 24. Only one of a plurality of pairs of brushes 26 is shown. In the preferred embodiment, as there are two pairs of brushes, this is a four pole motor.

FIG. 2 illustrates in greater detail the relationship among the several elements of the motor 10. The permanent magnets 22 are affixed to the steel back up member 30 and to the frame member 16 by adhesive or fasteners such as screws, not shown. The motor shaft 20 is rotatably supported by a pair of bearings 28 in the frame member 16. In order to be light weight, the frame member 16 is fabricated of aluminum with the steel backup ring 30 positioned around its outer diameter. The permanent magnets 22 may be formed of a strip of magnets mounted on a rubber binder or may be individual magnets.

Attached at the ouboard end of the shaft 20 is a web 15 having a hub support member 32 and a circular rim 34 extending from its trailing edge. Attached on the inside of the rim 34 is an armature winding 36 spaced by the air gap 24 from the permanent magnets 22. As illustrated in FIG. 2, the brushes 26, fixedly mounted to the stator 14 contact the armature winding 36 at its trailing end. The brushes 26 are located in cut-outs in the permanent magnets 22 and are insulated therefrom.

Figure 6:
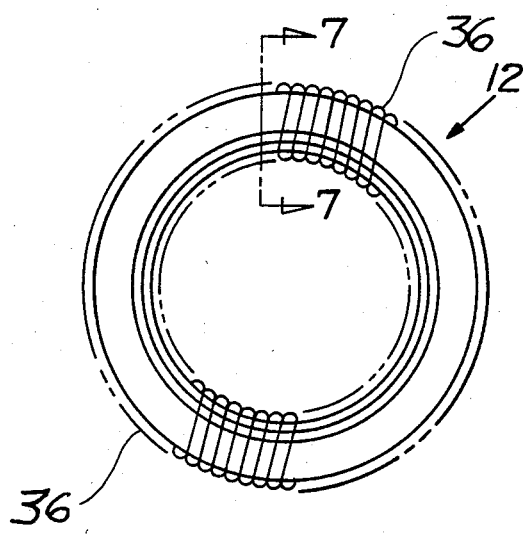
FIG. 6 is a plan view of an armature.
Figure 7:
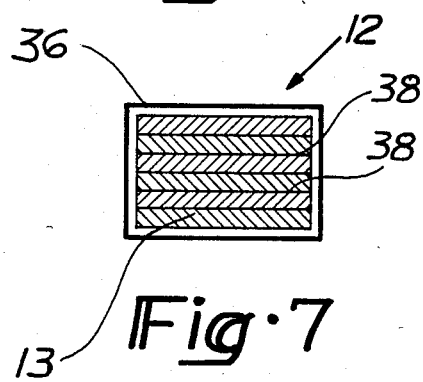
FIG. 7 is a sectional view taken along line 7—7 of FIG. 6.

The armature 12, further illustrated in FIG. 6, comprises a continuous strip 38 of ferrous material wound in layers forming a toroidal shaped core 13. Each layer is insulated from the next layer and the shape is secured by conventional means securing the beginning and the ending edges of the strip 38. The finished core 13 is then electrically insulated in order that the windings 36, which will be put thereon, are not electrically shorted to the core 13. Around the core 13, in this case wound in the dimension which is parallel to the axis of the motor 10, is a single layer winding 36 wound in a helical manner. Each loop of the winding 36 is insulated from the next loop and also insulated from the core 13. As shown in FIG. 1 and more particularly in FIG. 7, the cross section of the core 13 is typically rectangular and the winding is formed to conform to the shape. It is obvious that other cross sections such as square, oval or oblong shape may also be used.

The winding 36 may be formed from either round or square wire or may be a thin strip copper plated on the core wherein the copper is cut or etched with a helical groove extending around the core 13. Still another method of making the winding 36 may be by printed circuit techniques wherein a continuous winding is formed on a substrate which is secured to the core 13. The beginning and the end of the winding 36, be it the wire, strip copper or the printed circuit conductor, are connected together thus forming a continuous loop.

In order to provide a commutator 42, the portion of the insulation of the winding 36 in the area where the brushes 26 are located is stripped of its insulation so that the wire may be electrically conductive. This removal of insulation is on one surface only of the armature 12 and at the rear end portion of the armature 12 as shown in FIG. 1. The brushes 26 mounted on the frame member 16 are in electrical contact with the insulation-free wires of the armature 12. This makes the armature 12 and commutator 42 an integral or unitary structure.

Referring to FIG. 3 there is illustrated a motor constructed according to the present invention. In this particular figure, the armature or the rotor web 44 is the fan 46 itself and on the outer circumference thereof is the armature 12. The armature 12, as shown in FIG. 6, is a loop which is sized to mount on the circumferential surface of the fan 46. The stator 14 is attached to the frame member 48 and as shown in FIG. 4 contains the brushes 26 bearing against the commutator 42 which is one side of the armature 12. The armature 12 in FIGS. 3 and 4 is similar to the armature 12 of FIG. 6 in that it has a single layer winding 36 and along one side of the insulation is removed forming a commutator 42. Again, the stator 14 has permanent magnets 22 spaced from the rotor or armature 12 by a predetermined air gap 24.

In the embodiment of FIG. 3, the fan 46 is fabricated from a non-magnetic, nonelectrically conductive material such as a plastic and the armature 12 is affixed thereto. In this particular embodiment, the fan 46 itself becomes an integral part of the armature 12 functioning as its web 44.

Figure 5:
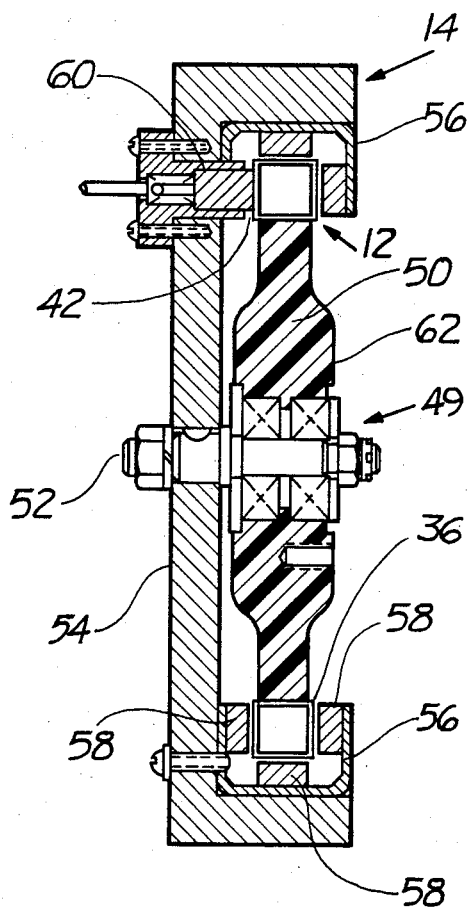
FIG. 5 is a sectional view taken along an axis of a motor.

FIG. 5 illustrates a motor 49 wherein the armature loop 12 is formed on the outside or the circumferential periphery of a web 50. In this particular figure, the web 50 is formed of a plastic material and is mounted for rotation about a fixed shaft 52 extending from a frame member 54. The armature 12 is similar to that shown in FIG. 6 in that it has a core with a substantially rectangular cross section about which a single layer endless winding 36 is wound.

Of particular interest in this figure is the configuration of the stator 14. The steel back up ring 56 is a channel-shaped member wherein permanent magnets 58 are shown as positioned on both inside surfaces and on the inside bottom surface of the ring 56. In this manner, the magnetic field generated by the magnets 58 is coupled through both the end and the sides of the armature 12. FIG. 5 is a section drawn along a centerline extending through one brush 60 to the center of the motor 49 and then from the center at an angle an equal distance between the brushes in order to illustrate the channel-shaped ring 56. The one brush 60 of at least one pair of brushes illustrated shows the brush riding on the commutator surface 42 of the armature 12 as in all previous illustrations.

In this illustration, the magnets 58 again may be individual magnets or may be a strip of magnets bound by a rubber compound and formed for their respective surfaces on the ring 56. In the areas where the brushes 60 are located there is a break in the magnetic strip on that particular surface. This is illustrated in the top portion of FIG. 5 as viewed on the drawings. If this motor 49 is used to turn a fan, it is seen that the fan may be affixed to the side surface 62 of the armature web 50 by means of fasteners such as screws. In one embodiment of a motor 49 of this configuration, the web is attached to the hub of the fan and the fan blade extends in a radial direction from the centerline of the fixed shaft 52.

In FIG. 5, the stator 14 having a channel-shaped ring 56, magnetically couples the armature 12 by both radial and axial magnetic flux paths from magnets 58 on all inside surfaces of the ring. The configuration of the ring 56, of a motor constructed according to the principles herein, is variable. Assuming an armature configuration as shown in FIG. 5, the steel back up ring 56 may be formed in an "L" shape. In this manner, the armature 12 may be coupled by one axial and one radial flux path.

Alternatively, the magnets 58 may be omitted from one or two surfaces of the channel ring 56 providing a combination of axial and radial flux paths. If the armature is configured so as to rotate between magnet surfaces, the steel back up ring 5 may be channel-shaped as illustrated in FIG. 5 but with the channel rotated ninety degreees so that the inside bottom surface extends in a radial direction and the two side surfaces are parallel to the axis of the shaft 52. It is seen that position and number of magnetic surfaces can range from one surface either axially or radially aligned to three surfaces, wherein there is one or two radial and two or one axially aligned surfaces. With the technique of forming flexible magnetic strips wherein magnetic particles are bound in a rubber backing, the magnetic strips may be shaped to conform to the shape of the stator steel back up ring. In fact, in such a configuration, which is not shown, the side surface nearest the shaft 52 may be a second stator and the rotor is then spaced from and between the stator and the second stator.

Figure 8:
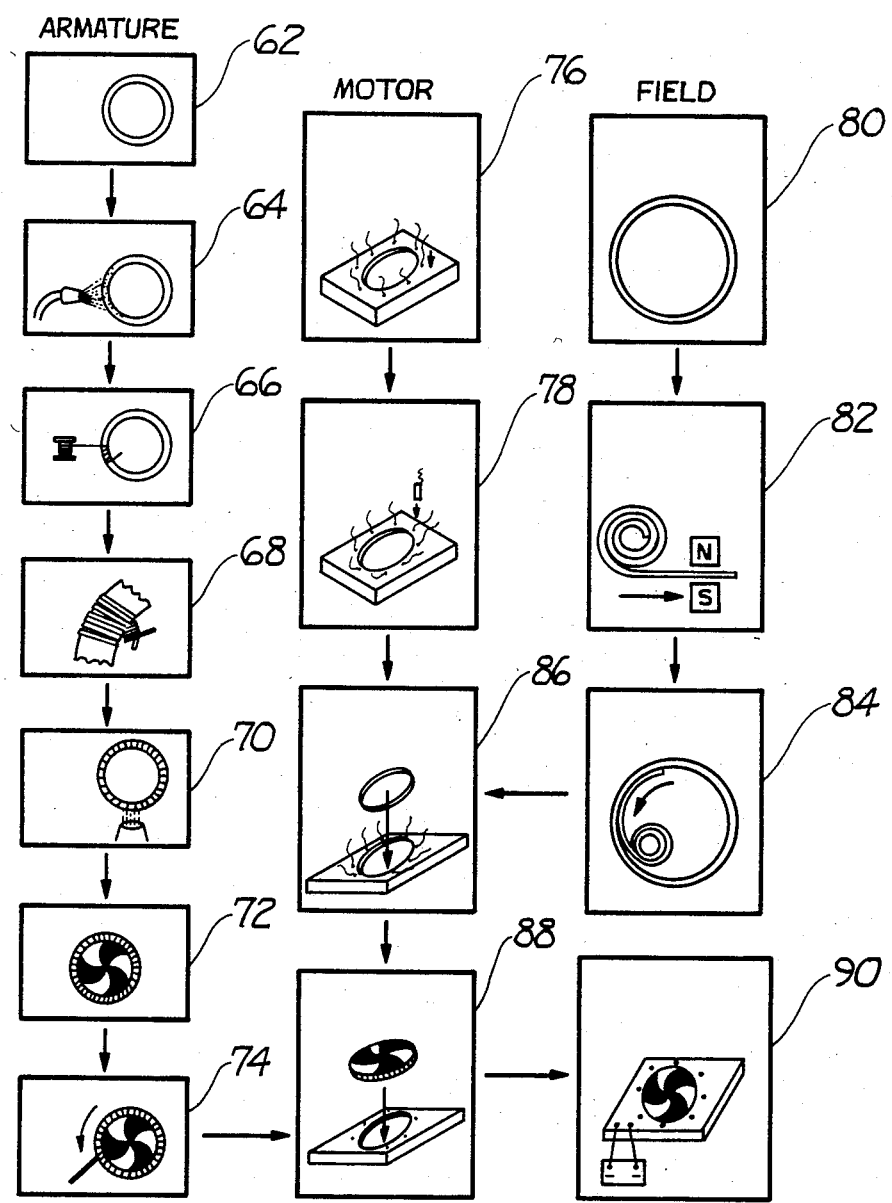
FIG. 8 is a pictorial flow chart of a method of making a motor according to a preferred embodiment of the invention.

Referring to FIG. 8 there is a series of pictorial representations illustrating a method making a hoop motor for a fan application. A predetermined length of a strip of ferrous material or magnetic steel is cut, and in step one 62 the core is fabricated from the continuous strip by coiling it in the shape of a toroid wherein each surface of the material is insulated from the adjacent surface. The ends of the continuous strip are then secured to the inside and the outside of the toroid, respectively, in such a manner so as to maintain the circular nature of the core 62. After the core has been completed, the next step 64 is to spray, brush or cover the core with an insulation material further providing an electrical insulation between the winding and the core. The insulated core is then 66 wound with a single layer of wire forming a continuous loop winding. As stated previously, wire itself may be used to wind the core or a copper strip may be secured to the core upon which strip a loop pattern is cut or etched. In addition, printed circuit techniques may be used to form a loop around the core. The next step 68 shows that the ends of the winding or loop formed on the core are connected together so as to form a continuous loop. The core and its winding are bonded together 70 to set the winding to the core and prevent any accidental snaring or cutting of the winding.

In the next step 72 the armature is then affixed to the circumferential periphery of the fan, namely on the outboard circumferential surface of the fan. In order to maintain the armature on the outer surfaces of the blades, the blades, in an axial direction along its outer surfaces, are formed so as to receive and locate the armature thereon. Thus, instead of a ring or hoop fan wherein the outer surface of the blades are connected together by means of material such as material of the blades, the armature forms that function. If this fan is to be mounted on a motor such as that illustrated in FIG. 3, it is necessary to remove the insulation on one surface of the windings of the armature. This may be done prior to step 72 or in the next step 74 by several means such as scraping or etching of the insulation from the wires, grinding the insulation off, or other means that will not operate to cut or cause the wires to short together. Thus, at this step 74 the fan and armature are complete and waiting for assembly into the motor itself.

If this is to be a radiator fan, the stator may be constructed in the shroud as shown in step 76 of the fan wherein an aperture is formed therein which fits the circumference of the fan described above. Mounted peripherally around the aperture, as shown in step 78, are a plurality of pairs of brushes sufficient to have the fan operate at the desired speed and with the desired air moving capability. Typically, these brushes are formed in apertures in the shrouds which receive brush holders into which the brushes and the brush springs are inserted. Note that all the wiring is contained on the shroud and is not on any moving member.

In step 80, the field is fabricated with a ferrous material forming a steel back ring. If this is a permanent magnet field motor, a strip of magnets bonded together by rubber are charged, step 82, appropriately and the magnetic strip of materials is formed inside the steel back up ring as illustrated in step 84. If as illustrated in FIG. 5, the ring is a channel-shape or L-shape ring, then the magnets may be placed on the bottom surface of the channel and on each side surface or the two side surfaces of an L-shaped material field core. However, if the ring has substantially a flat surface facing the fan or armature, then the magnets are affixed to the inside surface of the ring. The above positioning providing a combination of radial and axial magnetic air gaps.

The ring is then inserted 86 into the shroud and held in position by conventional means so as to prevent the ring from moving. The fan is now inserted 88 into the shroud and the web of the fan is secured to a bearing affixed to the frame of the shroud. In the final step 90 illustrated in FIG. 8, the unit is tested for speed, noise and air moving capabilities.

One salient advantage of a motor constructed according to the present invention is that the armature core is "a scrap-less core" in that the core is fabricated from a continuous strip of ferrous material. Conventional core construction generally includes stamping the size of the core out of plates and, therefore, have the waste attendant with taking a toroid shape out of a rectangular plate. As this is magnetic steel, the scrap value of the steel is not very high and hence much of the material is wasted and must be properly disposed.

Another feature of the present invention is the fact that there is not a separate commutator with the motor but the commutator is formed by means of the armature winding itself and is integral thereto. This allows for a reduction in the axial length of the motor.

Another advantage is when the motor is constructed, more particularly as in FIG. 3. The armature is on the outside surface of the blades which may be on a 13 inch or 33 centimeter diameter. A stator with a channel or L-shaped cross section steel back up ring will tend to assist to locate and secure the blade in position. Additionally, by placing the permanent magnets on all the inside surfaces of the channel or L-shaped stator, the efficiency of the magnetic flux cutting the armature and the use thereof in motor operation has been increased.

FIG. 2 illustrates the brushes mounted on the inside of the armature such that brush action is in a radial direction away from the axis of the motor. However, it is obvious that the construction of FIG. 2 may be such that the rotor is on the inside of the stator and the brushes will then be radially mounted in a direction towards the axis of the motor. However, by the formation of the commutator on the armature, the brushes may also be mounted as in FIG. 4 or in a direction substantially parallel to the axis of the motor.

There has thus been shown and described a dynamoelectric machine having a ring-shaped hoop or armature or rotor fabricated to combine both an armature and commutator means into a unitary structure.

What is claimed is:

1. A compact ring shaped brush motor comprising:
    a frame member;
    a stator mounted on said frame member;
    a ferrous back-up ring located on said stator and supporting a plurality of permanent magnets thereon;
    a rotor mounted for rotation in said frame member, said rotor formed of a continuous strip of ferrous material wound in a toroidal shape;
    winding means including insulated wire wound around said rotor forming a continuous conductive loop;
    commutator means formed on one surface of said winding means; and
    at least one pair of brushes equally and angularly spaced around said frame member and in operative contact with said commutator means.

2. A compact ring shaped brush motor according to claim 1 wherein said stator has an "L" shaped cross section with at least one pair of said permanent magnets mounted on both legs of said "L" shaped cross section equally and angularly spaced about each one of said brushes.

3. A compact ring shaped brush motor according to claim 2 wherein each one of said brush pairs is mounted in said frame member in a direction normal to one of said legs of said "L" shaped stator and the circumferential surface of said rotor is normal to the other of said legs of said "L" shaped stator.

4. A compact ring shaped brush motor according to claim 1 wherein said stator has a channel-shaped cross section where said rotor passes between and inside the sides of said stator, and having a plurality of permanent magnets mounted on the inside of said stator, said magnets formed in groups of at least two magnets each, each of said groups equally and angularly spaced around each one of said brushes.

5. A compact ring shaped brush motor according to claim 1 additionally including:
   a web member;
   bearing means coaxially mounted in said web member wherein said rotor is peripherally mounted on said web member and in radial alingment with said stator.

6. A compact ring shaped brush motor according into claim 5 additionally including a fan mounted for rotation with said web member.

7. A compact ring shaped brush motor according to claim 1 wherein said winding means on said rotor is a continuous loop of helically wound wire in a single layer around said rotor, the ends of said wire joined together forming a continuous loop.

8. A compact ring shaped brush motor according to claim 1 additionally including a second stator mounted in a parallel relationship to said stator and spaced in a radial direction from said rotor opposite said stator (14) forming a structure wherein said rotor is spaced from and between said stator and said second stator.

9. A compact ring shaped brush fan motor having a frame member, a stator mounted on the frame member, a ferrous back-up ring located on the stator and supporting a plurality of permanent magnets thereon, at least one pair of brushes diametrically spaced around said frame member, the motor characterized by:
   a fan blade member mounted for rotation concentric with the stator;
   a rotor mounted on said fan blade member, said rotor formed of a continuous strip of ferrous material wound in a toroidal shape;
   winding means wound in a single layer around said rotor forming a continuous conductive loop magnetically coupled to the stator; and
   commutator means formed on one surface of said winding means and in operative contact with the at least one pair of brushes.

* * * * *